16
A.I.
F. D. Newbury.
Breech Loader.
Additional Impt
No. 161.
Original No 15,621
Patented Mar. 31. 1857.
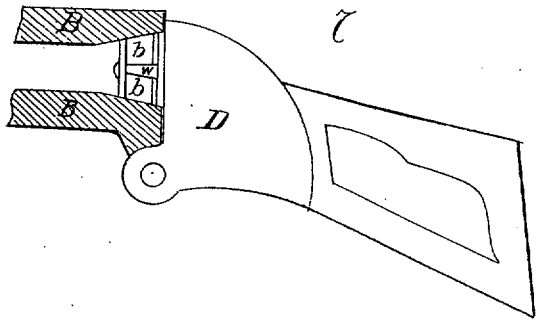
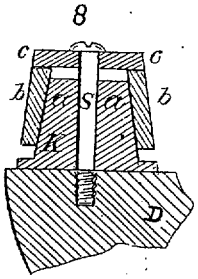
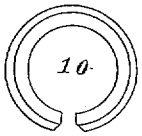
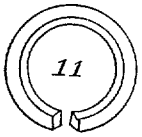
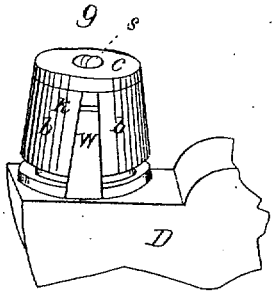
Witnesses
E. Smith
Signed
F. D. Newbury

UNITED STATES PATENT OFFICE.

F. D. NEWBURY, OF ALBANY, NEW YORK, ASSIGNOR TO R. V. DE WITT, JR.

IMPROVEMENT IN FIRE-ARMS.

Specification forming part of Letters Patent No. 15,521, dated August 12, 1856; Additional Improvement No. 161, dated March 31, 1857.

*To all whom it may concern:*

Be it known that I, FREDERICK D. NEWBURY, of the city of Albany, State of New York, have invented certain Improvements upon the Method of Constructing Breech-Loading Fire-Arms, (for which Letters Patent of the United States were granted to Richard Varick De Witt, Jr., as my assignee, on the 12th day of August, 1856;) and I declare the following specification, with the drawings hereto appended as a part of the same, to be a full and perfect description thereof, the improvement being in the breech-closer.

Figure 7 shows the same representation of the parts of the breech-loading piece as is exhibited in Fig. 4 of the original patent, D being the arm to which the breech-closing apparatus is attached. B represents the barrel. K is the breech-closer, and is shown in vertical section through its center in Fig. 8, and in perspective in Fig. 9. Fig. 10 is a plan of the ring from above, and Fig. 11 from below.

*a a* is a solid cone seated firmly upon the lever D. When closing the breech, it lies within the taper bore of the load-chamber. It is turned of a true conical form, less in size and more acute than the form of the chamber, so as to leave a space all around it. This space or a portion of it is filled with a conical ring, *b*, of equal length with the cone, the bevel of its inner surface being the same with that of the cone, and its outer surface fitted to the bore of the barrel, so as to stand upon the cone a short distance from its base, and projecting a corresponding distance above the top. This ring has cut out at one of its sides a portion of its substance in a taper form fitted to a flat wedge, W, whose taper or bevel is that of the cone. This wedge is attached to the base of the cone and reaches to the top. On the top of the ring *b* lies a flat disk, *c*. Its under surface is ground truly to the top of the ring, and the whole apparatus is held together and attached to the arm D by the screw *s*.

The parts being ground and fitted truly together, it is manifest that in case of wearing of any of the rubbing-surfaces the reaction of the charge in exploding will, by pressing down the disk *c*, force the ring *b* down upon the cone and the wedge W, expanding it to fill up fully the chamber in which it lies. The effect of the wedge W is to cause the ring to open with much greater ease than if left to the operation of the surface of the cone, and it closes perfectly all communication, by way of the slit in which it lies, between the charge-chamber and the rear of the barrel.

I am aware that two or more expanding rings have been used with a loose conical pin, and do not claim this.

I claim—

The employment of a permanent cone combined with a ring lying between it and the chamber of the barrel, with a disk fitted upon the ring, the ring being divided on one of its sides by a cut, into which is fitted a pin or wedge, the cone and wedge being so shaped in reference to the ring as to expand it against the charge-chamber upon the least reaction of the charge when fired.

F. D. NEWBURY.

Witnesses:

E. J. MILLER,

RICHD. VARICK DE WITT.